US012688179B2

(12) United States Patent
Shimon et al.

(10) Patent No.: US 12,688,179 B2
(45) Date of Patent: Jul. 21, 2026

(54) DATABASE UPDATES INDUCED COMMUNICATION IN A COMMUNICATION NETWORK

(71) Applicant: ISRAEL AEROSPACE INDUSTRIES LTD., Lod (IL)

(72) Inventors: Yitzhak Shimon, Tel Aviv (IL); Yacov Indik, Petah Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 78 days.

(21) Appl. No.: 17/927,202

(22) PCT Filed: May 24, 2021

(86) PCT No.: PCT/IL2021/050603
§ 371 (c)(1),
(2) Date: Nov. 22, 2022

(87) PCT Pub. No.: WO2021/240509
PCT Pub. Date: Dec. 2, 2021

(65) Prior Publication Data
US 2023/0244470 A1 Aug. 3, 2023

(30) Foreign Application Priority Data
May 24, 2020 (IL) .......................................... 274889

(51) Int. Cl.
*G06F 16/23* (2019.01)

(52) U.S. Cl.
CPC ...... *G06F 16/2358* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 5,684,990 A | 11/1997 | Boothby | |
| 7,650,365 B2 | 1/2010 | Launer et al. | |
| 8,170,988 B2 | 5/2012 | Yukawa et al. | |
| 8,972,459 B2 * | 3/2015 | Chaliparambil | ...... G06F 16/245 707/803 |

(Continued)

OTHER PUBLICATIONS

International Search Report and Written Opinion mailed Aug. 12, 2021 received in PCT/IL2021/050603.

(Continued)

*Primary Examiner* — Scott A. Waldron
(74) *Attorney, Agent, or Firm* — Ballard Spahr LLP

(57) ABSTRACT

According to the subject matter disclosed herein, an application miming on a network communication subsystem is assigned with at least one respective database, where data inputs received by the application induce a database update in the respective database. A database update automatically induces packaging of the updated data in a network message followed by transmission of the message to one or more other network communication subsystems connected to the same network. Likewise, in the other direction, an incoming network data-update message, received by the network communication subsystem, initiates a chain of events that cause a database update, which may ultimately affect the data provided to an application miming at the application layer.

30 Claims, 5 Drawing Sheets

(56)                    References Cited

U.S. PATENT DOCUMENTS

| | | |
|---|---|---|
| 9,916,764 B2 | 3/2018 | Shipley et al. |
| 2006/0080427 A1 | 4/2006 | Yach et al. |
| 2010/0115137 A1 | 5/2010 | Kim et al. |
| 2012/0209808 A1 | 8/2012 | Tien et al. |
| 2013/0267186 A1 | 10/2013 | Agarwal et al. |
| 2014/0032981 A1 | 1/2014 | Ahmed et al. |
| 2018/0131765 A1 | 5/2018 | Puleston et al. |

OTHER PUBLICATIONS

International Preliminary Report on Patentability mailed Nov. 9, 2022 received in PCT/IL2021/050603.
Davies , et al., "The Application of Packet Switching Techniques to Combat Net Radio", Proceedings of the IEEE vol. 75, No. 1, Jan. 1987, pp. 43-55.

\* cited by examiner

100

150₁

150₂

150ₙ

Communication network 120

150₃

150₄

150₅

Receiving and processing data input at an Application 401

Generating an update request and providing to the database 403

Updating the database according to the received data 405

Responsive to a database update automatically generating an update message 407

Transmitting the message to at least one other network node connected to the network 409

Receiving message transmitted by another
network node over the network
501

Processing the message and extracting
data and metadata from message
503

Updating database
505

Responsive to an indication of database
update, generating an application update
507

Providing update to one or more relevant
applications 509

DATABASE UPDATES INDUCED COMMUNICATION IN A COMMUNICATION NETWORK

FIELD OF THE PRESENTLY DISCLOSED SUBJECT MATTER

The presently disclosed subject matter relates to communication networks.

BACKGROUND

Different types of fleets utilize a wireless (radio) communication network for enabling communication between different mobile platforms in the fleet. As an example, aircraft fleets, including civilian (e.g., commercial) and military, commonly use radio frequency (RF) based networks (also known as "tactical networks"). The operation of such fleets often involves generation and transmission of vast amounts of data over the network, which may be challenging due to limitation on the available bandwidth of the communication network.

GENERAL DESCRIPTION

Data communication often occurs between different applications running on different mobile and/or static platforms e.g., of the same fleet. For example, a safety monitoring application can be configured, upon receiving input indicative of a flight hazard (e.g., from a data acquisition device, such as an image sensor or RADAR, or from a crew member) to disseminate this information to other platforms (e.g., other aircrafts) in the fleet. To this end the application generates a message that is forwarded to a network communication device, which is directly connected to the network and sends the message over the network. To enable this type of communication, applications are designed to directly interface with the network communication device in order to provide and/or receive the relevant information over the network. In this type of configuration, applications are often provided with the ability to communicate with the network, and generate, in response to data update at the application, an update message suitable to be transmitted over the network. Configuring each application with such abilities considerably complicates the development of applications. Furthermore, it also increases the operational load on the application during runtime due to the various tasks related to data updates and communication.

The presently disclosed subject matter includes a communication system connecting between different network nodes over a communication network. FIG. 1 is a schematic illustration of a communication network 120 used in a fleet of aerial vehicles, according to an example of the presently disclosed subject matter. Notably, although some principles are exemplified herein in connection with an aerial vehicles fleet (including for example, manned aerial vehicles or unmanned aerial vehicles or a combination thereof), this should not be construed to limit the scope, as the same principles can be applied to other networks, connecting between stationary platforms (e.g., stationary communication stations), other mobile platforms (e.g., ground or marine vehicles), or any combination thereof. The presently disclosed subject matter further contemplates a communication system which includes stationary nodes such as control stations and stationary sensors (e.g., stationary radar systems). Such communication systems may also include mobile platforms (e.g., aircrafts) but this is not always necessary.

According to the subject matter disclosed herein, an application running on a network communication subsystem is assigned with at least one respective database, where data inputs received by the application induce a database update in the respective database. The network communication subsystem is configured with a special database layer and network layer, where a database update automatically induces packaging of the updated data in a network message followed by transmission of the message to one or more other network communication subsystems connected to the same network. Generation and transmission of the message is carried out without involvement (or in some cases with limited involvement) of the application layer running the application, and thus enables to improve the efficiency of operation of the application layer and reduces its operational load. Likewise, in the other direction, an incoming network data-update message, received by the network communication subsystem, initiates a chain of events that cause a database update, which may ultimately affect the data provided to an application running at the application layer.

Thus, according to some examples, the system and method disclosed herein provide a cloud-like distributed data sharing infrastructure for sharing data between applications running by independent network nodes in a communication network (e.g., radio network). In practice network communication is implemented by data updates made to a database system distributed over a communication network, the data updates include changes made to the data/or metadata, stored in the database.

Furthermore, according to some examples only a small chunk of the data, pertaining to the specific data update (the changed data) from the database, is packed and transmitted with the network message, thereby enabling to reduce communication load on the communication channels, as well as transmission delays.

According to one aspect of the presently disclosed subject matter there is provided a communication system comprising:

a first network communication subsystem connected over a communication network to a second network communication subsystem;

the first network communication subsystem comprising:

a first processing circuitry configured to execute a first application and being operatively connected to a first database used for storing data related to the first application; a first database manager operatively connected to the first database; and a first network communication device;

the first database manager is configured, in response to an indication of a data update, made at the first application, to: update the database according to updated data corresponding to the data update;

the network communication device is configured to:

automatically generate, in response to the database update, a network data-update message comprising data indicative of the database update; and transmit the data-update message over the communication network to the second network communication subsystem.

In addition to the above features, the method according to this aspect of the presently disclosed subject matter can optionally comprise one or more of features (i) to (xiv) below, in any desired combination or permutation:

i. wherein the second network communication subsystem comprises:

a second processing circuitry executing a second application being operatively connected to a second database used for storing data related to the second application; a second database manager operatively connected to the second database; and a second network communication device;

the second network communication device is configured, responsive to receiving the network data-update message transmitted by the first network communication device, to extract the data from the network data-update message;

the second database manager is configured, to: update the second database with the extracted data; and wherein the database update made to the second database, induces an update to the second application with data pertaining to the database update, thereby providing data input to the second application induced by the database update.

ii. wherein the first application and the second application are operationally compatible, e.g., identical.

iii. wherein the first application is operatively connected to one or more input interfaces, the interfaces configured for receiving data input from one or more respective data sources.

iv. wherein the network data-update message further includes metadata identifying a respective database entry that has been updated in the first database.

v. wherein the first application is indirectly connected for data transmission to the first network communication device via a database layer comprising the first database and the first database manager.

vi. wherein the first application is operatively connected to a database interface enabling communication of data between the first application and the first database manager.

vii. wherein the network is a wireless network.

viii. wherein the network is an RF network.

ix. wherein the first network communication subsystem is mounted onboard a vehicle and the communication network is used for communication between vehicles in a fleet.

x. wherein the vehicle is an aircraft and the fleet is an aerial vehicles fleet.

xi. wherein the first database manager is further configured to forward data indicative of the database update to the first network communication device.

xii. wherein the first database manager is configured to identify a difference between the updated data and corresponding old data stored in the first database before the update; and wherein the data indicative of the database update includes a re-constructible part of the data corresponding to the difference.

xiii. wherein, while the first application is in standby mode (not operated for performing its designated tasks) the first processing circuitry is configured, in response to data updates at the first database, to update the first application according to the database update.

xiv. Wherein the first and the second communication network subsystems are both part of the communication system.

According to another aspect of the presently disclosed subject matter there is provided a method of sharing data updates between network nodes connected over a communication network, the method comprising:

at a first network node using at least one processing circuitry for:

executing a first application; the application being operatively connected to a first database used for storing data related to the first application;

in response to an indication of a data update that includes updated data, made at the first application, updating the database according to the received data;

generating a network data-update message comprising data indicative of the database update, wherein the generation is automatically induced in response to the database update; and transmitting the network data-update message over the communication network to at least one other network node connected over the communication network.

Wherein in some examples the method further comprises:

at a second network node connected to the communication network, using at least one processing circuitry for:

executing a second application, the second application being operatively connected to a second database used for storing data related to the second application;

receiving, via the communication network, the network data-update message;

extracting the data from the network data-update message;

executing a database update in the second database using the extracted data; and following the database update made to the second database, providing the data pertaining to the database update to the second application, wherein the provision of data to the second application is automatically induced in response to the database update.

According to another aspect of the presently disclosed subject matter there is provided a non-transitory program storage device readable by a computer, tangibly embodying a program of instructions executable by the computer to perform a method of sharing data updates between network nodes connected over a communication network, the method comprising:

at a first network node, using at least one processing circuitry for:

executing a first application; the application being operatively connected to a first database used for storing data related to the first application;

in response to an indication of a data update that includes updated data, made at the first application, updating the database according to the received data;

generating a network data-update message comprising data indicative of the database update, wherein the generation is automatically induced in response to the database update; and transmitting the network data-update message over the communication network to at least one other network node connected over the communication network.

According to another aspect of the presently disclosed subject matter there is provided a non-transitory computer readable storage medium tangibly embodying a program of instructions that, when executed by a computer, cause the computer to perform a method of sharing data updates between network nodes connected over a communication network, the method comprising:

at a first network node connected to the communication network, using at least one processing circuitry for:

executing a first application, the first application being operatively connected to a first database used for storing data related to the first application;

receiving via the communication network a network data-update message indicative of a data update that occurred at a second application executed at a different network node;

extracting the data from the network data-update message;

executing a database update in the first database using the extracted data; and following the database update made to the second database, providing the data pertaining to the database update to the first application, wherein the provision of data to the first application is automatically induced in response to the database update.

According to another aspect of the presently disclosed subject matter there is provided a network communication subsystem connectible over a communication network to another network communication subsystem;

the network communication subsystem comprising:

a first processing circuitry executing a first application and being operatively connected to a first database used for storing data related to the first application; a first database manager operatively connected to the first database; and a first network communication device;

the first database manager is configured, in response to an indication of a data update that includes updated data, made at the first application, to: update the database according to the received data;

the network communication device is configured to:

automatically generate, in response to the database update, a network data-update message comprising data indicative of the database update; and transmit the data-update message over the communication network to the other network communication subsystem.

The network communication device is configured, responsive to receiving a network data-update message transmitted by the network communication subsystem and indicative of a data update that occurred at a second application executed at the other network communication subsystem, to extract data from the network data-update message;

the first database manager is configured, to:

update the first database with the extracted data; and following the database update made to the first database, provide the data pertaining to the database update to the first application, thereby performing updates to the first application induced by the database update.

According to another aspect of the presently disclosed subject matter there is provided a method of sharing data updates between network nodes connected over a communication network, the method comprising:

at a first network node, using at least one processing circuitry for:

executing a first application; the application being operatively connected to a first database used for storing data related to the first application;

in response to an indication of a data update that includes updated data, made at the first application, updating the database according to the received data;

generating a network data-update message comprising data indicative of the database update, wherein the generation is automatically induced in response to the database update; and transmitting the network data-update message over the communication network to at least one other network node connected over the communication network;

receiving via the communication network a network data-update message indicative of a data update that occurred at a different network node;

extracting the data from the network data-update message;

executing a database update in the first database using the extracted data; and following the database update made to the second database, providing the data pertaining to the database update to the first application, wherein the provision of data to the first application is automatically induced in response to the database update.

The presently disclosed subject matter further contemplates a mobile (e.g., vehicle) or stationary platform (e.g., ground control station) comprising the network communication subsystem of the previous aspect, for enabling data communication with the platform.

The method(s), the system the computer storage device(s) and network communication subsystem, disclosed in accordance with the presently disclosed subject matter can optionally comprise one or more of features (i) to (xiv) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
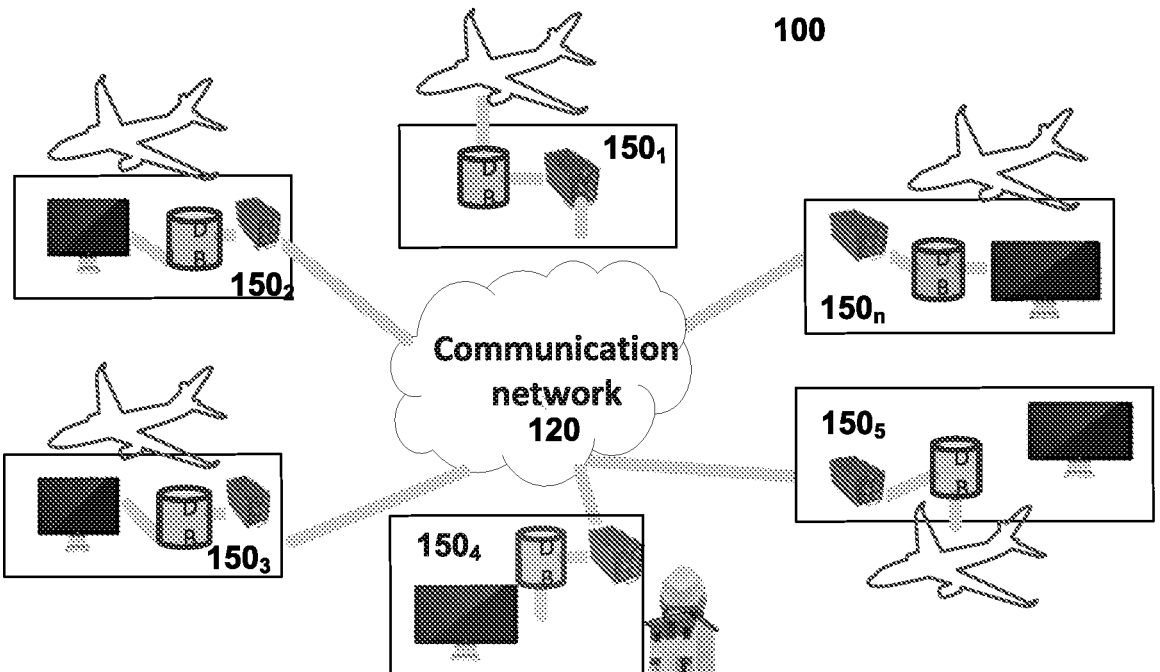
FIG. 1 is schematic illustration demonstrating a network, in accordance with an example of the presently disclosed subject matter.

In the drawings and descriptions set forth, identical reference numerals indicate those components that are common to different embodiments or configurations. Elements in the drawings are not necessarily drawn to scale.

Unless specifically stated otherwise, as apparent from the following discussions, it is appreciated that throughout the specification discussions utilizing terms such as "executing", "updating", "generating", "transmitting" or the like, include an action and/or processes of a computer that manipulate and/or transform data into other data, said data represented as physical quantities, e.g., such as electronic quantities, and/or said data representing the physical objects.

The terms computer/computer device/computerized device, or the like, should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.). The processing circuitry can comprise for example, one or more processors operatively connected to computer memory, loaded with executable instructions for executing operations as further described below. Each one of the network communication subsystems $150_{1-n}$ described herein includes or is otherwise associated with one or more computers.

The operations in accordance with the teachings herein may be performed by a computer specially constructed for the desired purposes, or by a general purpose computer specially configured for the desired purpose by a computer program stored in a computer readable storage medium.

As used herein, the phrase "for example," "such as", "for instance" and variants thereof, describe non-limiting embodiments of the presently disclosed subject matter. Reference in the specification to "one case", "some cases", "other cases", or variants thereof, means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

Figure 2:
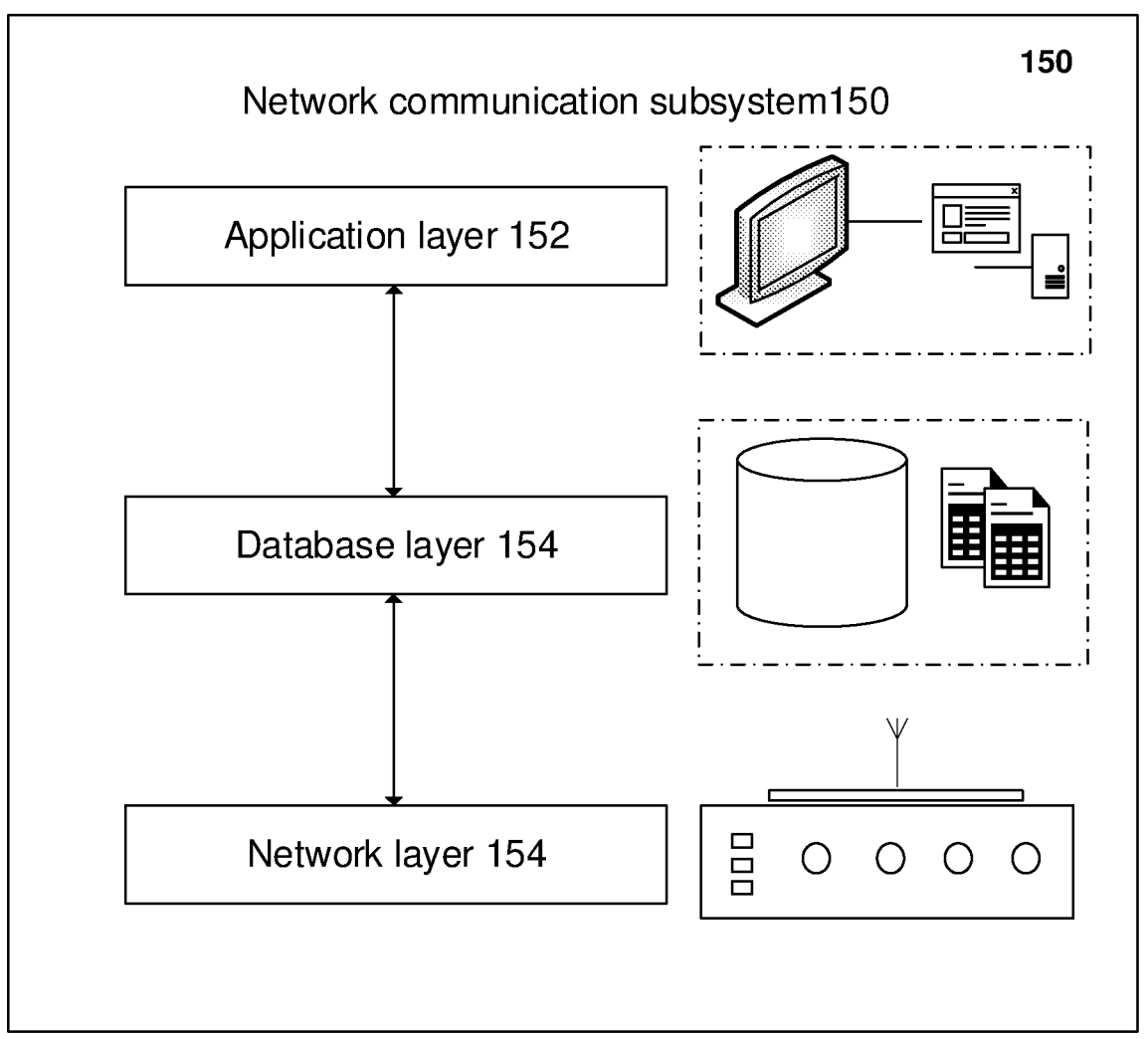
FIG. 2 is a block diagram illustrating a network communication subsystem, in accordance with an example of the presently disclosed subject matter.
Figure 3:
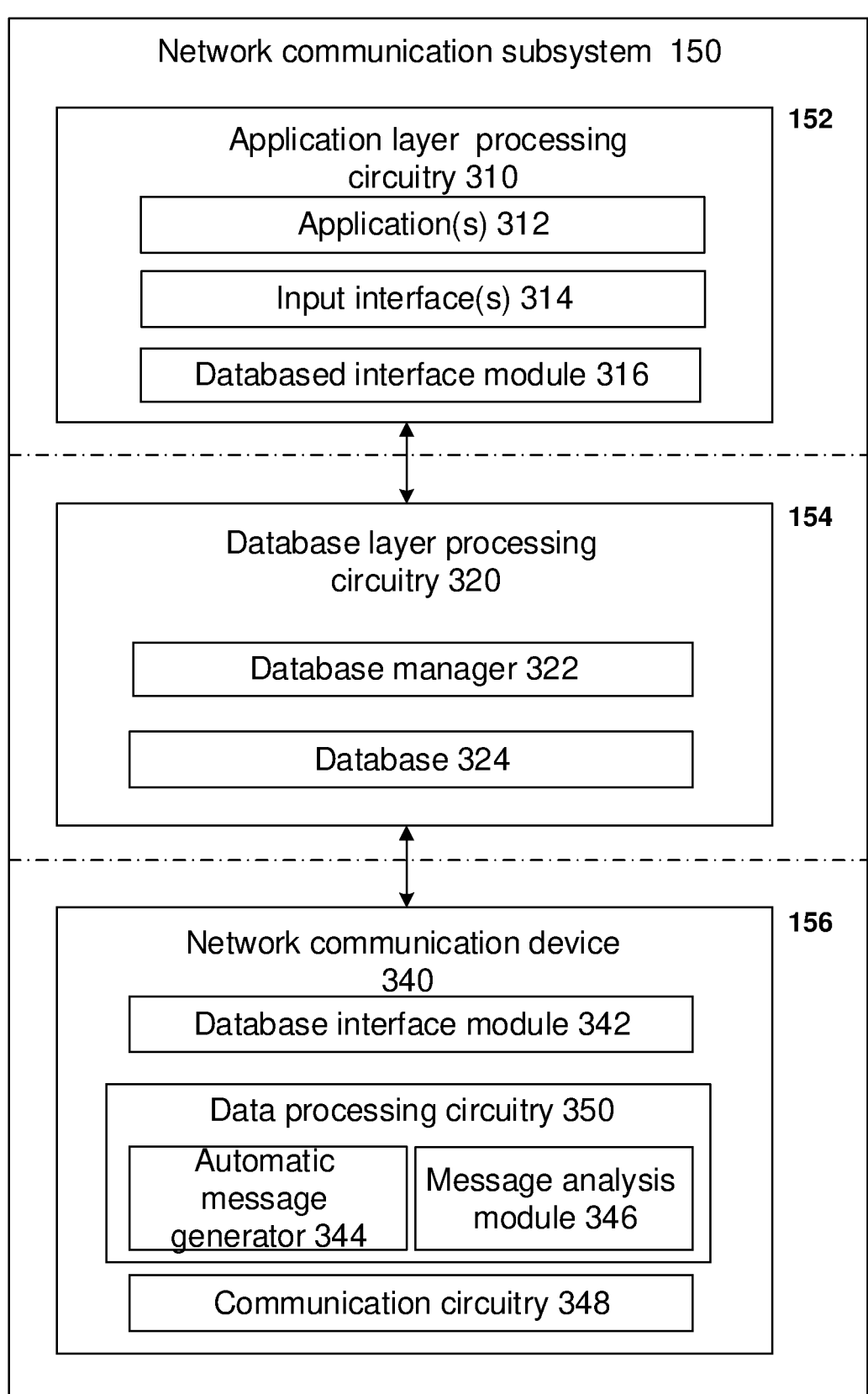
FIG. 3 is a block diagram illustrating a network communication subsystem, in accordance with an example of the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination In embodiments of the presently disclosed subject matter, fewer, more and/or different stages than those shown in FIGS. 4 and 5 may be executed. In embodiments of the presently disclosed subject matter, one or more stages illustrated in FIGS. 4 and 5 may be executed in a different order and/or one or more groups of stages may be executed simultaneously. FIGS. 2 and 3 illustrate a general schematic of the system architecture in accordance with an embodiment of the presently disclosed subject matter. Elements in FIGS. 2 and 3 can be made up of any combination of software and hardware and/or firmware that performs the functions as defined and explained herein. Elements in FIGS. 2 and 3 may be centralized in one location or dispersed over more than one location. In other embodiments of the presently disclosed subject matter, the system may comprise fewer, more, and/or different elements than those shown in FIGS. 2 and 3. For example, FIG. 3 describes network communication subsystem 150. The separate processing circuitries shown in FIG. 3 are presented by way of example only, while it should be clear to any person skill in the art that more or less processing circuitries can be used instead. Likewise, it should be understood that the specific division of the functionally of the disclosed system to specific parts as described below, is provided by way of example, and other alternatives are also construed within the scope of the presently disclosed subject matter. According to another example, network communication device 340 which is described as a single device, can in reality include a number of interconnected devices.

Attention is now drawn to FIG. 1 showing a plurality of platforms connected over communication network 120. Specifically, the illustrated example shows an aerial fleet communication network connecting between a plurality of aircrafts. The communication network can be for example a wireless network or a hardwire network, including for example, a radio frequency communication network.

As shown, each aircraft is equipped with a respective onboard network communication subsystem ($150_{1 \ldots n}$; also referred to herein as a "network node"), representing a node or endpoint in the network 120 and configured to communicate with other network nodes over the communication network 120. FIG. 1 also shows ground control station 130, which is also connected to network 120 via a respective network communication subsystem 1504.

FIG. 2 is a block diagram showing a high level view of network communication subsystem 150 and FIG. 3 shows subsystem 150 in more detail, according to some examples. Network communication subsystem 150 includes a hardware computing device with one or more processing circuities configured and operable for executing various operations as described herein below.

As will be further detailed with reference to the figures below, one or more processing circuitries in network communication subsystem 150 can be configured to execute several functional modules in accordance with computer-readable instructions implemented on a non-transitory computer-readable storage medium. Such functional modules are referred to hereinafter as comprised in a respective processing circuitry.

In some examples, subsystem 150 can be logically and/or physically divided into three layers: application layer 152, database layer 154 and network layer 156. Application layer 152 is configured in general to run one or more applications. For example, applications can include an object tracking application, where objects detected by various sensors onboard a platform (e.g., aircraft) are processed and characterized, and information about detected objects is transmitted to other platforms connected to the network. Such an application can be configured to execute various data update operations related to detected objects, including for example: updating the position of a detected object, updating various features of a detected object (e.g., its size or velocity), sending a text message with information pertaining to a detected object; etc.

The application layer is operatively connected to the database layer 154 which includes a local database for storing and managing data. As mentioned above, according to some examples, an application running at the application layer 152 may have one or more respective databases stored and managed at the database layer. Information pertaining to a certain application is stored in its respective database(s). The database layer is operatively connected to the network layer 156, which comprises a network communication device 340 configured in general for communicating with other devices connected to the same network. Network communication device can comprise various components that facilitate its functionality, including for example, a communication circuitry 348 and a computer (processing circuitry 350). The communication circuitry may comprise, for example, part or all of the following: a wireless network interface card configured to enable communication with the network, switches, routers, bridges, transceiver, and radio communication device. As further discussed below, data which is received via both the application layer and the network layer is forwarded and stored in the database.

According to the presently disclosed subject matter, in some examples data sharing between different network nodes is an automatic process, where data input at one of the terminal layers (application layer 152 and network layer 156) induces a database update at the database layer 154 and the database update further induces the sharing of the update, either with an application running at the application layer, or with other network nodes connected over the network through the network layer. In some examples, the application layer 152 and the network layer 156 are only indirectly connected, enabling transmission of data updates only through the database layer 154.

In operations, data input received from either the application layer 152 or the network layer 156 is processed, and the relevant database is updated accordingly. In addition to updating the database with data received from the application layer (e.g., from a running application) or network layer (transmission of data received from a different network node), the database layer is also configured, when appropriate, to forward the data received from the application layer to the network layer, and forward data received from the network layer to the application layer. For example, data received at the database layer from an application running at the application layer is packed as an update message and transmitted to other network nodes over the network. Furthermore, the database layer is configured, responsive to an incoming update message received from other network nodes in the network, to update the database and transmit the data to a relevant application running at the application layer.

Figure 4:
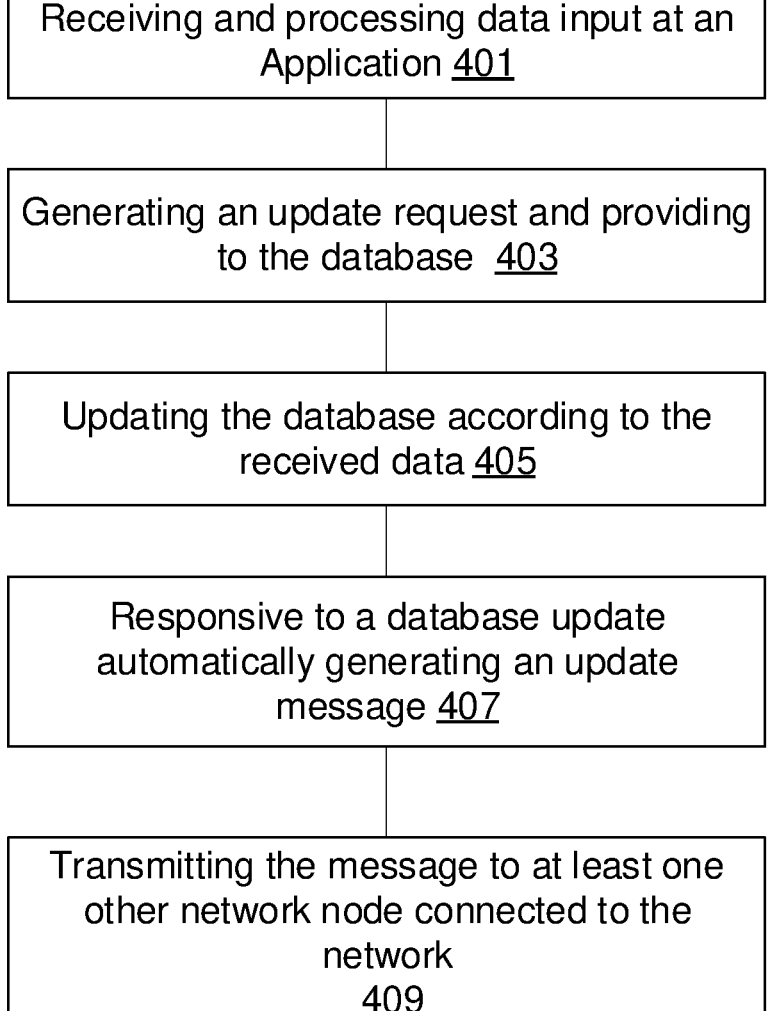
FIG. 4 is a flowchart illustrating operations performed by a network communication subsystem during egress communication, in accordance with an example of the presently disclosed subject matter.
Figure 5:
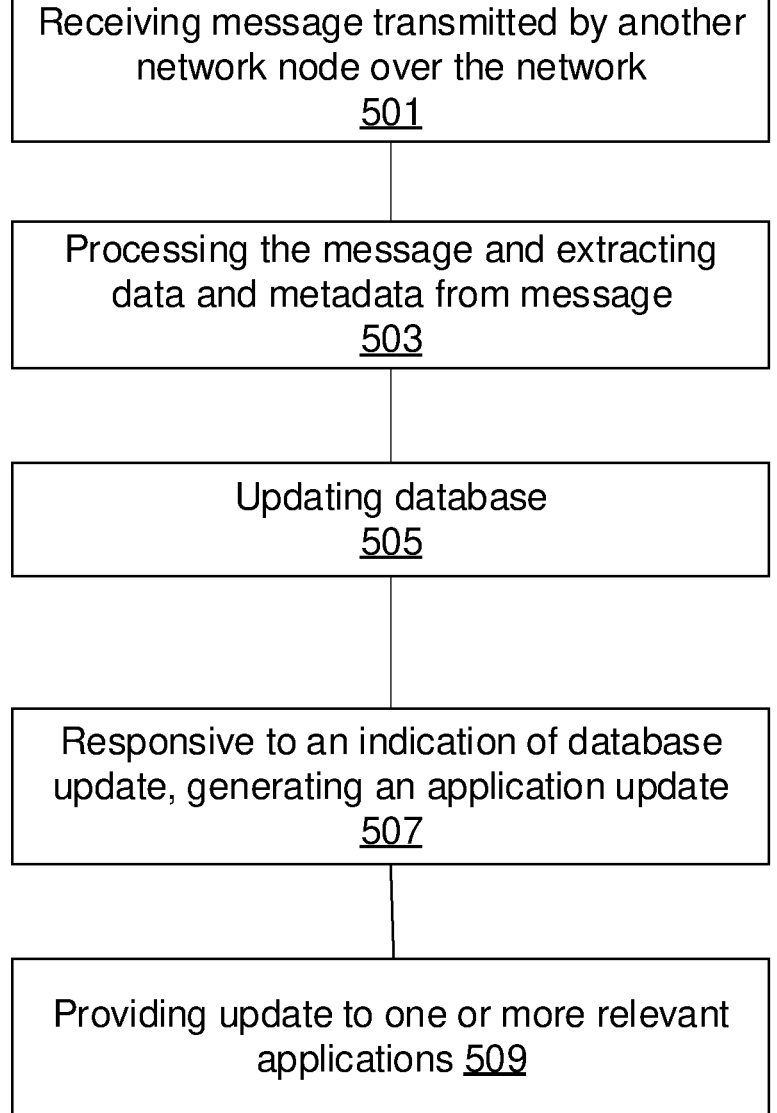
FIG. 5 is a flowchart illustrating operations performed by a network communication subsystem during ingress communication, in accordance with an example of the presently disclosed subject matter.

FIG. 4 is a flowchart illustrating operations performed by network node for egress communication, according to some examples of the presently disclosed subject matter. While some operations in FIGS. 4 and 5 are described with reference to the system components described in FIGS. 2 and 3, this is done by way of example only and should not be construed to limit the scope to the specific system design shown in the figures.

FIG. 4 describes operations which are carried out when a message is being transmitted from one network node to one or more other network nodes connected to the same communication network.

At block 401, data input is provided to an application being executed at the application layer 152. As shown in FIG. 3, the application layer may include a computerized device that comprises an application layer processing circuitry 310 configured to run at least one application 312. The processing circuitry 310 further comprises or is otherwise operatively connected to one or more input interfaces 314, configured to enable data input to the application from one or more respective data sources (e.g., external to network node 150). Input interfaces can include for example, a user interface (e.g., graphic user interface being responsive to a computer mouse and keyboard commands) for receiving data input from an operator (e.g., a pilot or an operator). In some cases, data is generated internally by the application itself. Other examples include interfaces connecting between the application and other systems and/or various data acquisition devices that may provide input to the application. Data acquisition devices can include for example an imaging system (e.g., electro-optic camera system), a RADAR system, or other sensors such a pitot tube, altimeter, LIDAR, Doppler, etc.

For example, data on detected targets received from a RADAR system can be provided through an input interface to a running application. In some examples, the application generates instructions directly resulting from the data input that affect the operation of a host platform, e.g., host aircraft. For example, in case targets detected by a RADAR system represent hazards that should be avoided (e.g., other aircrafts in the vicinity of the host aircraft), a navigation application may generate instructions in response to the input data, updating the flight path of the aircraft for the purpose of avoiding collision with the detected targets. In another example in case an application receives (e.g., from an engine monitoring unit) data indicative of an imminent critical mechanical failure of the engine, a flight control system can respond by preparing for an emergency landing.

In case it is determined that a database update is needed as a result of the data input, a database update request is generated and transmitted to the database (block 403). In some examples, the application layer can include a database interface module 316 configured to establish communication between the application layer and the database layer, and can be further configured to generate database update requests (e.g., an SQL update) and send them to a database manager 322 that manages a respective database 324. The database can be implemented on a respective computer data storage (e.g., Hard Storage devices (HDD) or Solid State Drives (SSD, comprising for example, a plurality of NAND elements), DRAM, non-volatile RAM, or any other computer storage technology or combination thereof).

Notably, according to some examples, the process of generating a database update occurs automatically in response to received input at the application layer as a background process to the ongoing operation of the application. The application may be completely unaware of this process and continue to operate without being interrupted by the update. For example, the database interface module 316 can be configured to monitor all data updates made to a running application and automatically generate update messages and transmit these messages to the database manager 322, without (or with limited) interference to the ongoing operation of the application.

Following reception of an update request, the request is processed at the database layer and the respective database of the relevant application is updated accordingly (e.g., by database manager 322; block 405). For example, in cases where an application is received from a radar system data pertaining to detected targets, a database entry (e.g., row and/or column) designated for storing information about detected targets is updated to store the newly received data.

According to some examples, data received at the database layer (e.g., as a database update request) is processed (e.g., by the database manager 322) to determine whether the received data merits a database update or not. Data input which is received from the application layer is processed to determine whether it includes updated data (including new data/metadata or changes to existing data/metadata already stored in the database) that requires a database update. For example, time tags attached to update requests that indicate the time and date the relevant data has been generated may be used to determine whether an incoming update request includes updated data or obsolete data that should be ignored.

In some examples, in order to enable efficient and accurate database updates, database manager 322 implements update rules that associate between specific data fields in the application and corresponding fields and rows in the database. Data received from an application is recognized and assigned to a respective database column and/or row based on predefined association rules between the column/row and application fields.

In some examples, the same update rules correlating between a specific application and its respective database(s) are applied in all network nodes connected to the same network. This provides uniformity when treating input data across all network nodes, and thus enables identical data to be treated in the same manner by all network nodes. Thus, updated data received by a first application running on one network node, when transmitted from the first network node to other network nodes in the network running the same application (or an operationally compatible application), would induce the same update in all network nodes.

Furthermore, a predefined data identification protocol can be implemented in all network nodes enabling uniform processing of network data-update messages. According to one non-limiting example, a system of unique identifiers can be used, where each database is assigned with a unique identifier. Database entries (e.g., a specific row and/or specific column), storing specific information, are uniquely identified as well, where the same unique identification is used for identifying a given entry depending on the type of data it holds. Accordingly, two different databases may be each assigned with a different unique identifier, but may both comprise a specific entry storing the same type of data, and therefore the specific entry in both databases would be identified with an identical identifier. Assuming data in that specific entry is updated in a first database, a network data-update message can comprise metadata that includes for example the unique identifier of the database, and the identifier of the respective database entry which is also assigned to an entry in a different database holding the same type of data. In some examples, metadata can further comprise time tags indicating the time of generation of the message. The source of a network data-update message (as indicated for example by the database identifier), and time of generation, can be used by a receiving network node for determining the validity of an incoming message, and deciding whether to use or discard the message.

It is noted that the term "operationally compatible" is used herein to include different applications that use the same data. Thus, when a data update provided to a first application is disseminated over the network, it is used by other applications which are different, but nonetheless operationally compatible, and use the same data. For example, data received from a radar system indicating detected targets may be used by both a collision avoidance application providing instruction to a flight control unit, and a weapon system application providing instructions to a weapon system.

According to some examples of the presently disclosed subject matter, the communication system disclosed herein is further configured for reducing data communication load on the network. To this end, when a network data-update message is generated at the network layer, it is done while striving to minimize the amount of data that is transmitted in such a message. Responsive to an update made to a respective database, the specific data element which has been changed is identified and packed in a new network data-update message, along with metadata.

As explained above, the metadata can include, inter alia, information identifying the respective location (entry) of the data in the database, e.g., including identifiers of the respective database, column and row. Due to the uniformity that is maintained between databases in different network nodes, a data update that is identified in a network data-update message, can be assigned to the appropriate location in the appropriate database. Furthermore, since updates to respective applications are automatically induced as a result of corresponding database updates, information that is sufficient for a database update is also sufficient for a corresponding application update. This enables to minimize the data which is transferred in network data-update messages to only the changed data corresponding to a database update and the metadata.

For example, consider an object tracking application that continuously provides updates pertaining to changes in the position of a tracked object. In response to detection of a change in the object location, the tracking application is updated, and this update induces a database update in a respective database associated with the application. Following the database update, a new network data-update message is generated to be transmitted to other network nodes over the network. During generation of the data-update message, only the change in the location of the tracked object is added to the message and its respective location in the database. For example, assuming location is provided according to the military grid reference system (MGRS) NATO standard, in a format that includes a sequence of letters and numbers, a message indicating a change in the position of a tracked object, can include only the changed value in the sequence and the respective position of the changed values in the sequence. Giving a concrete example:

Original position: 4QFJ122450878

Updated position: 4QFJ122450879

In this example, only the value of the last digit has been changed, therefore only that value along with an identifier of the value (e.g., another value indicating the location of the value in the sequence, in this specific example, '13'), are added to the message. It is noted that other methods of data compression can be likewise implemented, as is well known in the art.

Thus, according to some examples, the database manager 322 can be configured to compare between the old data stored in the database and the updated data received as input, determine the difference between the old and updated data, and provide only the difference in a re-constructible format (i.e., a format that enables reconstruction of the data at the receiving network nodes) to the network communication device 340. According to other examples, other components of the system may be configured to perform this comparison and analysis (e.g., at the network layer).

Continuing with the example of an object tracking application, as will be further explained below, when the message is received at a different network node connected to the network, the updated location of the tracked object is extracted from the message, and the respective database is updated accordingly. This induces, in turn, an update to one or more respective applications associated with the databases.

In response to the database update, an automatic message generation process is executed (block 407). According to some examples, this process is initiated at the network layer responsive to a database update. For example, a database interface module 342, in a network communication device 340 at the network layer, can be configured to communicate with the database manager 322 and receive from the database manager a message indicating that a database update has occurred. The message can include the newly updated data, as well as metadata indicating the corresponding entry (e.g., the respective row and column) that was updated with the updated data.

Responsive to the indication received from the database layer, a network data-update message is generated. In some examples, an automatic message generator 344 is configured to receive the data from the database interface module 342 and generate a network data-update message that includes the updated data in a format fitted to be transmitted over the communication network according to an appropriate communication protocol. For example, in cases of an RF communication network, an appropriate data-update message is generated suitable to be transmitted over an RF network, and in accordance with the communication protocol implemented in the network.

In some examples, the message is encrypted before transmission. To this end, network communication device 340 can further include a data encryption/decryption processing circuitry (e.g., as part of message generator 344 or communication circuitry 348).

At block 409, the automatically generated network data-update message is transmitted over the network to at least one other network node. In some examples, one or more identifiers, identifying target recipients, are added to the message. Network communication device 340 can further include a router (e.g., as part of communication circuitry 348) configured to route outgoing data-update messages to other specific network nodes 150 according to the identifiers. According to other examples, metadata (e.g., an identifier) is added to the network data-update message identifying the message, and the message is broadcast over the network to all network nodes. Each network node may include a router that determines whether to receive (pull) the data-update message, based on its identifier. The router may also be configured for prioritization of data transmission. Using encrypted messaging, as mentioned above, enables to selectively disseminate the message only to those network nodes that have the corresponding key needed for decrypting the message.

Furthermore, the presently disclosed subject matter enables to update the application data, while the application itself is partly active (not operating for performing its designated tasks, e.g., is in standby mode). For example, an image processing application may be activated for processing images only in response to specific image input, and is maintained in standby mode as long as the input is not received. During this time, while the application is partly active, it can be continuously updated with updated data received from identical or compatible applications running on other network nodes. The automatically induced application updates, disclosed herein, enables the application to continuously receive updated information in a passive manner without the need to issue network queries, requesting the updated data. Since no queries are needed, and only passive "listening" to the associated database is required, the application can be updated while being partly active, thus saving critical update time and also further reducing load on the application during times it is fully functional.

FIG. 5 is a flowchart illustrating operations performed by network node for ingress communication, according to some examples of the presently disclosed subject matter.

At block 501 a network data-update message is received at a network device 340 of a certain network node 150. For example, a router (e.g., being part of communication circuitry 348), which is directly connected to network 120, receives the message and determines whether it is relevant to the respective network node. For example, a network data-update message may be relevant only to those network nodes that run the same application (or operationally compatible applications), as the one that induced generation of the message. In such cases, a router in network communication devices 340 can be configured to process the message and determine (e.g., based on an identifier received in the message, or based on whether or not a corresponding decryption key is available for decrypting the message) whether or not to pull in the network data-update message for further processing and update.

At block 503, the network data-update message is further processed by the network device, e.g., the message is decrypted, and the data and metadata are extracted from the message (e.g., by message analysis module 346).

The extracted data is forwarded (e.g., by database interface module 342) to the database layer, where it is determined (e.g., by the database manager 322) which entries in the database (e.g., which columns and rows, as indicated by the metadata attached to the message) pertain to the received data, and updates the database accordingly (block 505).

As explained above, according to some examples, the message includes metadata (e.g., a unique identifier) identifying the relevant entry in the database to which the updated data received in the update message is related. As each database of a certain application has a specific structure that is maintained in all network nodes running the same or operationally compatible application, incoming data can be more easily assigned to the respective entry in the database stored on the receiving network node. Furthermore, when a unique identifier is used for identifying the database entries (i.e. holding identical data), albeit in different databases, identifying the relevant entry is possible even if the databases of the transmitting network node and receiving network node are not identical.

In response to the database update, an update indication message is generated and provided to the respective application (blocks 507, 509). For example, the database manager 322 can generate and send a message to the database interface module 316 indicating that a database update has occurred, the message including the updated data and possibly also data indicating the relevant application and/or a relevant field in the application. Database interface module 316 can be configured to provide the message (or data extracted from the message) to the respective application which inserts the updated data in the appropriate place (e.g., with the help of processing circuitry 310 running the application). Thus, an incoming network data-update message initiates a chain of events that cause a database update, which ultimately affects the data provided to the application. In addition to displaying the updated data at the application, as explained above, updates made to an application may affect various systems interfacing with the application, where the operation of such systems may be altered in response to the database update.

The system and method disclosed herein is useful for automatically coordinating the operation between different nodes (e.g., vehicles) in a fleet. For example, assuming the application is a navigation application onboard an aircraft (e.g., a drone) that receives coordinates of target destinations, and generates instructions for leading the drone to the target destination accordingly, information on a new target destination can be disseminated to all vehicles using the system disclosed herein, where each platform is configured, responsive to receiving an update message to a respective database, through the network, to automatically update the navigation parameters of the application, which in turn generates instructions, causing the drone to fly towards the target destination. In some examples, the drone which is located closest to the target or one which carries the required payload would be the that is sent to the target destination to complete a relevant mission, while all other drones can update their databases with information pertaining to the identity of the selected drone and the mission. As explained above, the transmission of data to and from a network node is performed as an automatically generated chain of events induced by incoming data and a corresponding database update.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A communication system for communicating between platforms in a fleet of platforms, where each platform comprises a network communication subsystem, the system comprising a first network communication subsystem of a first platform connected over a communication network to one or more other network communication subsystems of one or more other platforms;

the first network communication subsystem comprising:

a processing circuitry configured to execute a first application;

a first database configured to communicate with the first application;

a database manager configured to manage operations in the first database; and a first network communication device configured to communicate with the first database and with other network communication subsystems;

wherein propagation of data updates of the first application to one or more applications executed on one or more other network communication subsystems, respectively, is executed through database updates that are automatically induced by updates at the first application, without database queries being issued for propagating the data updates, by either the first application of the applications executed at the other network communication subsystems;

the database manager is configured, following a data update at the first application, to automatically execute a database update at the first database according to the data update;

the first network communication device is configured in response to the database update to automatically generate a network data-update message comprising data indicative of the database update; and to transmit the first network data-update message over the communication network to the one or more other network communication subsystems.

2. The communication system of claim 1, wherein responsive to receiving a second network data-update message transmitted by a second network communication subsystem and indicative of a data update that occurred at a second application executed at the second network communication subsystem, the network communication device is configured to respond to the second network data-update message by:

extracting the data from the second network data-update message; and updating the database with the extracted data;

the database manager is configured to automatically respond to the database update by providing the data pertaining to the database update to the first application, thereby performing automatic data update to the first application induced by the database update and not by the first application or the second application.

3. The communication system of claim 2, wherein the first application and the second application are identical or operationally compatible.

4. The communication system of claim 2, wherein automatic updates to the first application are performed while the first application is in standby mode.

5. The communication system of claim 1, wherein the first application is operatively connected to one or more input interfaces, each interface configured for receiving data input from a respective data source.

6. The communication system of claim 1, wherein the first network data-update message further includes metadata identifying a respective database entry that has been updated in the database.

7. The communication system of claim 1, wherein the first application is indirectly connected for data transmission to the first network communication device via a database layer comprising the database and the database manager.

8. The communication system of claim 1, wherein the first application is connected to a database interface configured to monitor data updates made at the first application and automatically update the database, without awareness of the first application.

9. The communication system of claim 1, wherein the network is a wireless network.

10. The communication system of claim 9, wherein the network is an RF (radio frequency) network.

11. The communication system of claim 1, wherein the platforms in the fleet include any one of an aerial, ground or marine vehicles.

12. The communication system of claim 1 wherein the platforms in the fleet are aerial vehicles, and the fleet is an aerial vehicles fleet.

13. The communication system of claim 1, wherein the database manager is further configured to forward data indicative of the database update to the first network communication device.

14. The communication system of claim 1, wherein the database manager is configured to identify a difference between updated data corresponding to the data update and corresponding old data stored in the database before the update; and wherein the data indicative of the database update includes a re-constructible part of the data corresponding to the difference instead of the entire data.

15. A communication system comprising:

a first network communication subsystem connected over a communication network to one or more other network communication subsystems;

the first network communication subsystem and the one or more other network communication subsystems are each divided into a plurality of layers including an application layer, a database layer, and a network layer; wherein transmission of data updates between the application layer and the network layer is performed through the database layer;

propagation of data updates of the first application to one or more applications executed on one or more other network communication subsystems, respectively, is executed through database updates that are automatically induced by updates at the first application, without database queries being issued, for propagating the data updates by either the first application of the applications executed at the other network communication subsystems wherein, in the first network communication subsystem:

the application layer comprises: a first processing circuitry configured to execute a first application; the database layer comprises a first database; the network layer comprises a first network communication device configured to communicate with the first database and with other network communication subsystems;

the database layer is configured, to automatically respond to the data update, made at the first application, by automatically executing a database update at the first database according to the data update;

the first network communication device is configured to automatically respond to the database update by:

generating a network data-update message comprising data indicative of the database update; and transmitting the network data-update message over the communication network to the one or more other network communication subsystems;

wherein, in at least a second network communication subsystem of the one or more other network communication subsystems:

a respective application layer comprises: a second processing circuitry configured to execute a second application; a respective database layer comprises a second database; a respective network layer comprises a second network communication device configured to communicate with the second database and with other network communication subsystems;

the second network communication device is configured to automatically respond to receiving the network data-update message transmitted by the first network communication device, by:

extracting the data from the network data-update message;

executing a database update at the second database according to the extracted data; and the respective database layer is configured to automatically respond to the database update made to the second database by providing the data pertaining to the database update to the second application at the respective application layer, thereby performing automatic data update to the second application induced by the database update.

16. A method of sharing data updates between network nodes connected over a communication network wherein each node comprises a respective application layer, database layer and network layer, the method comprising:

automatically propagating data updates of a first application executed at a first application layer of a first network node to one or more other application layers executed on one or more other network nodes, respectively, through database updates that are automatically induced by updates at the first application, without database queries being issued for propagating the data updates by either the first application or the applications executed at the other application layers, comprising:

at the database layer of the first network node in response to a data update made at the first application executed at the first application layer, automatically executing a database update-according to the data update;

at the network layer of the first network node:

in response to the database update, automatically: generating a first network data-update message comprising data indicative of the database update; and transmitting the first network data-update message over the communication network to at least one other network node connected over the communication network.

17. The method of claim 16 further comprising:

at the network layer of the first network node:

receiving a second network data-update message transmitted by a second network node indicative of a data update that occurred at a second application executed at the second network node;

extracting the data from the second network data-update message;

at the database layer of the first network node:

executing a second database update in the database using the extracted data; and following the second database update made to the database, automatically updating the first application with data pertaining to the database update, thereby performing an update to the first application induced by the second database update.

18. The method of claim 17, wherein the first application and the second application are identical or operationally compatible.

19. The method of claim 17, wherein automatic update to the first application is performed while the first application is in standby mode.

20. The method of claim 16, wherein the first network data-update message further includes metadata identifying a respective database entry that has been updated in the first database.

21. The method of claim 16, wherein the network is a wireless network.

22. The method of claim 21, wherein the network is an RF (radio frequency) network.

23. The method of claim 16, wherein the first network node is mounted onboard a vehicle and the communication network is used for communication between vehicles in a fleet.

24. The method of claim 23 wherein the vehicle is an aircraft.

25. The method of claim 16, further comprising: at the first network node, identifying a difference between updated data corresponding to the data update and corresponding old data stored in the first database before the update; and wherein the data indicative of the database update includes a re-constructible part of the data corresponding to the difference.

26. The method of claim 16 comprising: monitoring the first application layer and in response to detecting a data update occurring at the first application, automatically updating the database, without involvement of the first application.

27. A first network communication subsystem connectible over a communication network to other network communication subsystems;

the first network communication subsystem comprising:

a processing circuitry configured to execute a first application;

a first database configured to communicate with the first application;

a database manager configured to communicate with the first database, and a first network communication device configured to communicate with the first database;

wherein propagation of data updates of the first application to one or more applications executed on one or more other network communication subsystems, respectively, is executed through database updates that are automatically induced by updates at the first application, without database queries being issued for propagating the data updates by either the first application or the applications executed at the other network communication subsystems;

the database manager is configured, in response to a data update at the first application, to automatically update the first database according to the data update;

the first network communication device is configured in response to the update at the database to automatically;

generate a network data-update message comprising data indicative of the database update; and transmit the first network data-update message over the communication network to the one or more other network communication subsystems.

28. The first network communication subsystem of claim 27, wherein responsive to receiving a second network data-update message transmitted by a second network communication subsystem and indicative of a data update that occurred at a second application executed at the second network communication subsystem, the network communication device is configured to respond to second network data-update message by:

extracting the data from the second network data-update message; and updating the database with the extracted data;

the database manager is configured to automatically respond to the database update by providing the data pertaining to the database update to the first application, thereby performing automatic data update to the first application induced by the database update and not by the first application or the second application.

29. A non-transitory computer readable storage medium tangibly embodying a program of instructions that, when executed by a computer, cause the computer to perform a method of sharing data updates between network nodes connected over a communication network, wherein each node comprises an application layer a database layer and a network layer the method comprising at a first network node connected to the communication network:

automatically propagating data updates of a first application executed at a first application layer of the first network node to one or more other application layers executed on one or more other network nodes, respectively, through database updates that are automatically induced by updates at the first application, without database queries being issued for propagating the data updates by either the first application of the applications executed at the other application layers, comprising:

at the database layer of the first network node;

in response to a data update made at a first application executed at the first application layer, automatically updating a database according to the data update;

at the network layer of the rat network node;

in response to the database update, automatically;

generating a first network data-update message comprising data indicative of the database update; and transmitting the first network data-update message over the communication network to at least one other network node connected over the communication network.

30. The non-transitory computer readable storage of claim 29, wherein the method further comprising: monitoring the first application layer and in response to detecting a data update occurring at the first application, automatically updating the database, without involvement of the first application.

\* \* \* \* \*